United States Patent [19]
Tsuda et al.

[11] Patent Number: 5,186,789
[45] Date of Patent: Feb. 16, 1993

[54] METHOD OF MAKING A CANTILEVER STYLUS FOR USE IN AN ATOMIC FORCE MICROSCOPE

[75] Inventors: Nobuhiro Tsuda; Hirofumi Yamada, both of Tukuba; Hiroyuki Kado, Osaka; Takao Tohda, Ikoma, all of Japan

[73] Assignees: Agency of Industrial Science and Technology, Tokyo; Matsushita Electric Industrial Co., Ltd., Osaka, both of Japan

[21] Appl. No.: 799,993

[22] Filed: Nov. 29, 1991

[30] Foreign Application Priority Data

Nov. 29, 1990 [JP] Japan .................. 2-334024

[51] Int. Cl.$^5$ ................. H01L 21/306; B44C 1/22; C03C 15/00; C23F 1/00
[52] U.S. Cl. .................. 156/659.1; 156/643; 156/653; 156/657; 156/662; 156/904
[58] Field of Search ............ 156/643, 653, 657, 656, 156/659.1, 661.1, 662, 904; 250/306

[56] References Cited

U.S. PATENT DOCUMENTS 4,943,719 7/1990 Akamine et al. ............ 156/647 X

FOREIGN PATENT DOCUMENTS

WO90/08397 7/1990 European Pat. Off. .

OTHER PUBLICATIONS

"Microfabrication of Cantilever Styli for the Atomic Force Microscope", Albrecht et al., Journal of Vacuum/Science and Technology, Jul./Aug., No. 4.
"Use of Gold Films as Masks for a KOH Preferential Etch", Ogita et al., Thin Solid Films, 120(1984), pp. L79–81.
"Improved Atomic Force Microscope Images Using Microcantilevers with Sharp Tips", Akamine et al., Applied Physics Letters, 57(3), Jul. 16, 1990.
"Fabrication of Nanostructure by Anisotropic Wet Etching of Silicon", Shimuzu et al., Japanese Journal of Applied Physics, vol. 27, No. 9, Sep. 9, 1988, pp. L1778–L1779.
"CR-P/Si Thin Film Cantilever Structures", IBM Technical Disclosure Bulletin, vol. 33, No. 1B, Jun., 1990.

Primary Examiner—William A. Powell
Attorney, Agent, or Firm—Wenderoth, Lind & Ponack

[57] ABSTRACT

A cantilever stylus suited for use in an atomic force microscope is made in the following processes: forming a first film on a substrate; forming a second film of metallic material on an external surface of the first film; forming a photoresist film on an external surface of the second film by making use of a photolithography technique; performing etching with respect to the second film with only a portion thereof covered with the photoresist film left on the first film; and further performing etching with respect to the first film with the second film being used as a resist film so that the first film may be configured into a cantilever stylus.

4 Claims, 2 Drawing Sheets

METHOD OF MAKING A CANTILEVER STYLUS FOR USE IN AN ATOMIC FORCE MICROSCOPE

BACKGROUND OF THE INVENTION

1. Field of the Invention

The present invention relates generally to a method of making a cantilever stylus for use in an atomic force microscope, and more particularly to a method of making a flat-cantilever having a free end, of which an edge is used as a stylus.

2. Description of the Prior Art

Conventionally, a scanning tunneling microscope (hereinafter referred to simply as STM) has been developed as an instrument capable of observing the surface of a solid body on the atomic scale. However, since the STM detects a tunnel current between a sample and a stylus to observe the surface of the sample, it is impossible for the STM to observe the surface of an insulator. In order to solve this problem, an atomic force microscope (hereinafter referred to simply as AFM) for observing the surface of a sample by detecting forces acting between the sample and the stylus has been proposed. Because the AFM detects minute forces, it requires a cantilever having a stylus and a length of about 100 μm. The resolving power of the AFM depends greatly upon the radius of curvature of the stylus. The less the radius of curvature is, the higher is the resolving power.

FIG. 1 depicts a conventional cantilever 1 for use in an atomic force microscope. This cantilever 1 is a flat-cantilever formed of a thin film of $SiO_2$ or $Si_3N_4$. An edge 2 of the cantilever 1 is used as a stylus. This kind of cantilever is generally made by the use of the photolithography technique.

Because a cantilever for an atomic force microscope generally has a length of about 100 μm, the thickness thereof must range from 1 to 1.5 μm in consideration of strength thereof. In making such a cantilever, etching must be performed with respect to a thin film having a thickness of about 1-1.5 μm. In an ordinary photolithography process, after a photoresist has been formed on a thin film of cantilever material such as, for example, $SiO_2$ or $Si_3N_4$, etching is performed with respect to the thin film with only a portion thereof covered with the photoresist left. The wet-etching technique is generally employed in this etching and the dry-etching technique is not available because the film of cantilever material is relatively thick for the dry-etching. Even by the use of the wet-etching technique, however, it is likely that such a thickness would cause separation of the photoresist during etching, thereby causing a relatively large under-etching in which that portion of the film of cantilever material from which the photoresist has been separated is excessively etched. As a result, an edge of the cantilever made in the above-described manner has a radius of curvature of about 1 μm in a direction parallel to the surface of the cantilever and a radius of curvature greater than it in a direction perpendicular to the surface of the cantilever. An atomic force microscope employing such a cantilever cannot possibly obtain a resolving power on the atomic scale.

SUMMARY OF THE INVENTION

The present invention has been developed to overcome the above-described disadvantages.

It is accordingly an object of the present invention to provide an improved method of making a cantilever stylus for use in an atomic force microscope, which stylus is capable of observing the surface of a sample on the atomic scale.

In accomplishing this and other objects, a method according to the present invention comprises the steps of:

forming a first film on a substrate;

forming a second film of metallic material on an external surface of the first film, the metallic material being different from a material of the first film;

forming a photoresist film on an external surface of the second film by making use of a photolithography technique;

performing etching with respect to the second film with only a portion thereof covered with the photoresist film left; and further performing etching with respect to the first film with the second film being used as a resist film so that the first film is configured into a cantilever stylus suited for use in an atomic force microscope.

According to the method of the present invention, because it is sufficient if the second film of metallic material to be formed on the first film has a thickness of 1000 Å, the problem of separation would not occur even when a photoresist film is used as a resist for etching the metallic film. Such a thickness can easily be processed by either of the wet-etching technique or the dry-etching technique.

Furthermore, the metallic film has superior adhesive properties with respect to a film of cantilever material, as compared with the photoresist film. Accordingly, even if the film of cantilever material is removed 1-1.5 μm by etching with the metallic film as a resist, the metallic film is subjected to no separation. The method according to the present invention, therefore, can provide a high-accuracy cantilever stylus having an edge with a very small radius of curvature.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENT

Figure 1:
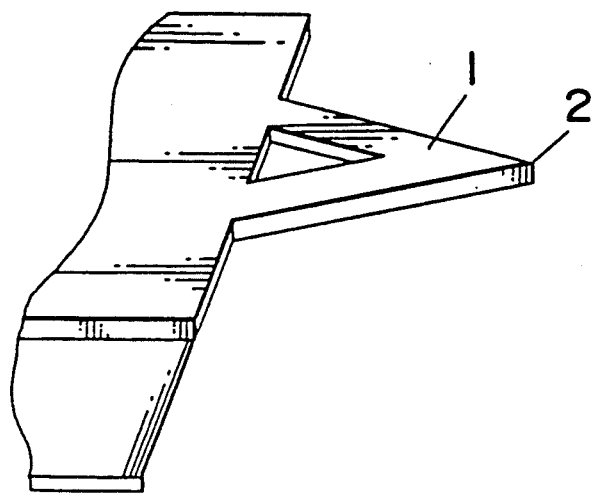
FIG. 1 is a perspective view of a conventional cantilever stylus for use in an atomic force microscope.

Referring now to the drawings, there are shown in FIGS. 2a to 2d processes for manufacturing a cantilever stylus suited for use in an atomic force microscope.

Figure 2A:
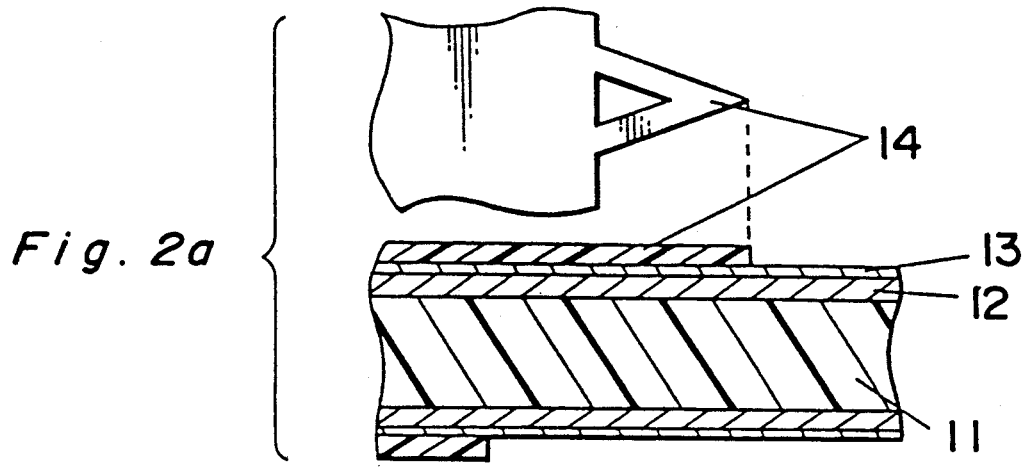
FIGS. 2a to 2d are schematic views explanatory of manufacturing processes according to the present invention.

Two $SiO_2$ films 12 each having a thickness of 1.5 μm were initially formed on respective surfaces of a silicon substrate 11 having a thickness of 300-400 μm by thermal oxidation. Two Cr films 13 each having a thickness of 1000 Å were then formed on external surfaces of respective $SiO_2$ films 12 by sputtering. After two photoresist films were coated on external surfaces of respective Cr films 13, one of them was configured into a photoresist film 14 in the form of a V-shaped cantilever having a length of about 100 μm by the photolithography technique, as shown in FIG. 2a. The material of the photoresist films is of the positive type to enhance the accuracy.

Figure 2B:
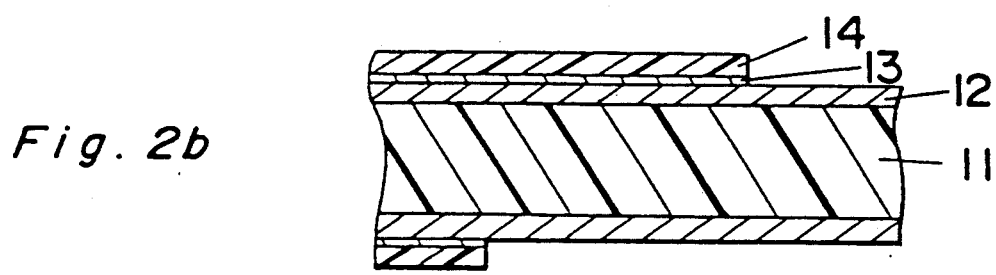

Thereafter, the substrate 11 was submerged in a mixed solution of cerium ammonium nitrate, perchloric acid, and water so that the Cr films 13 might be subjected to etching with the portions thereof covered with the photoresist films left on respective $SiO_2$ films 12, as shown in FIG. 2b.

Figure 2C:
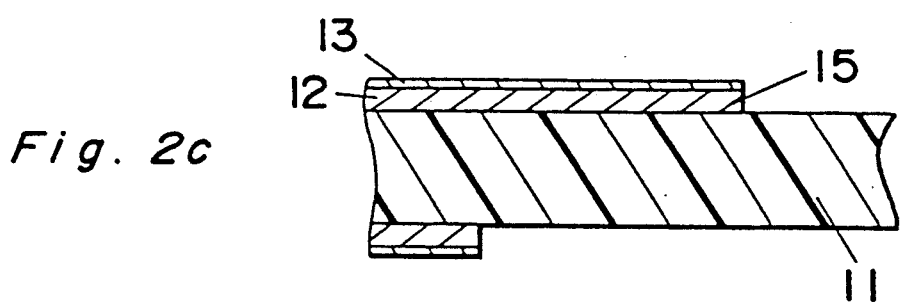

Subsequently, the substrate 11 was submerged in a mixed solution of hydrofluoric acid and ammonium fluoride and the $SiO_2$ films 12 each having a thickness of 1.5 μm was subjected to etching with respective Cr films 13 acting as resist films. In this way, a cantilever 15 as shown in FIG. 2c was made.

Figure 2D:
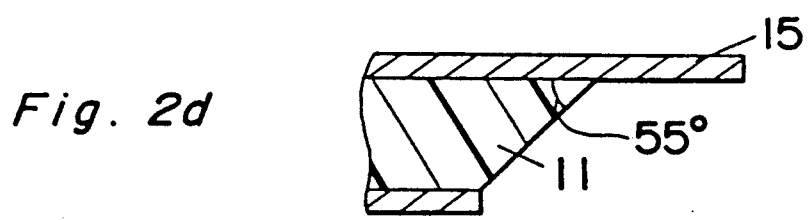

After the Cr films 13 were removed from respective $SiO_2$ films 12, the substrate 11 was submerged in a mixed solution of ethylenediamine, catechol, and water having a temperature of 100° C. so that the silicon substrate 11 might be subjected to anisotropic etching from respective surfaces thereof, as shown in FIG. 2d. In this case, the cantilever 15 formed an angle of 55° with that surface of the substrate 11 from which part of the substrate 11 was removed by the etching.

Figure 3:
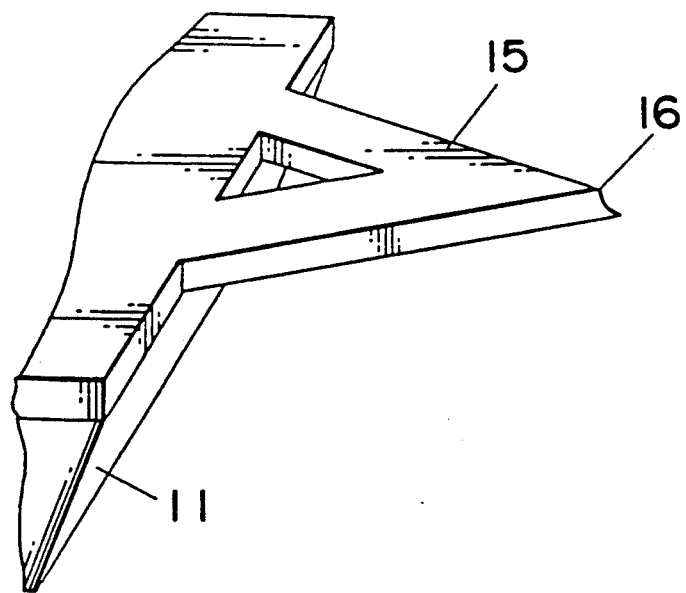
FIG. 3 is a perspective view of a cantilever stylus made by the processes of FIGS. 2a to 2d.

FIG. 3 depicts a cantilever stylus made through the above-described processes.

As shown in FIG. 3, a V-shaped cantilever stylus 15 having a length of about 100 μm was made of an $SiO_2$ film formed on the surface of a silicon substrate 11. A free end 16 of the cantilever stylus 15 had a radius of curvature of 300 Å in a direction parallel to the surface of the substrate 11 and a radius of curvature of 200 Å in a direction perpendicular thereto.

During etching of the $SiO_2$ films 12, the radii of curvature could be further reduced by the so-called "overetching".

In this process, although the wet-etching was performed with respect to the Cr films 13, the employment of the dry-etching could further enhance the accuracy. In this case, plasma etching with the use of $CCl_4$ was available.

Silicon nitride, for example $Si_3N_4$, can be used as a material of the cantilever stylus, as well as silicon oxide.

Furthermore, Co, Fe, Al, W, Mo, Ti, Ta, Au, Ag, Pt, Ni, Rh, Zr, Hf, Nb, or the like can be used as a material of the metallic film to be formed on the cantilever material, as well as Cr. These metals have superior adhesive properties with respect to the cantilever material. Of these metals, Cr, Fe, Co, and Ni have particularly superior adhesive properties and therefore were available in making a superior cantilever stylus.

As is clear from the above, the method according to the present invention can provide a cantilever stylus having a tip with a radius of curvature less than 300 Å. The use of such a cantilever stylus is particularly useful for the manufacture of an atomic force microscope having a very high resolving power and capable of observing the surface configuration of various materials including insulators on the atomic scale.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of making a cantilever stylus for use in an atomic force microscope, which comprises the steps of:

forming a first film on a substrate;

forming a second film of metallic material on an external surface of said first film, said metallic material being different from a material of said first film;

forming a photoresist film on an external surface of said second film by making use of a photolithography technique;

performing etching with respect to said second film with only a portion thereof covered with said photoresist film left on said first film; and further performing etching with respect to said first film with said second film being used as a resist film so that said first film is configured into a cantilever stylus suited for use in an atomic force microscope.

2. The method according to claim 1, wherein said first film is made of silicon oxide.

3. The method according to claim 1, wherein said first film is made of silicon nitride.

4. The method according to claim 1, wherein said second film is made of a material selected from the group consisting of Cr, Fe, Ni, Co, Al, W, Mo, Ti, Ta, Au, Ag, Pt, Rh, Zr, Hf, and Nb.

* * * * *